US012043322B2

(12) United States Patent
Kim

(10) Patent No.: US 12,043,322 B2
(45) Date of Patent: Jul. 23, 2024

(54) STEERING CONTROL SYSTEM, STEERING CONTROL DEVICE, AND STEERING CONTROL METHOD

(71) Applicant: HL MANDO CORPORATION, Pyeongtaek-si (KR)

(72) Inventor: Taegyun Kim, Gyeonggi-do (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 570 days.

(21) Appl. No.: 17/311,514

(22) PCT Filed: Dec. 10, 2019

(86) PCT No.: PCT/KR2019/017386
§ 371 (c)(1),
(2) Date: Jun. 7, 2021

(87) PCT Pub. No.: WO2020/122555
PCT Pub. Date: Jun. 18, 2020

(65) Prior Publication Data
US 2022/0032993 A1 Feb. 3, 2022

(30) Foreign Application Priority Data
Dec. 10, 2018 (KR) ........................ 10-2018-0157763

(51) Int. Cl.
*B62D 5/04* (2006.01)
*B62D 3/12* (2006.01)
*B62D 6/00* (2006.01)

(52) U.S. Cl.
CPC ................. *B62D 5/04* (2013.01); *B62D 3/12* (2013.01); *B62D 6/00* (2013.01)

(58) Field of Classification Search
CPC ................................. B62D 5/04; B62D 5/0469
See application file for complete search history.

(56) References Cited

U.S. PATENT DOCUMENTS 11,046,360 B2 * 6/2021 Jin ........................ B62D 5/0463
2002/0026843 A1 * 3/2002 Park ........................ B62D 3/12
74/422

(Continued)

FOREIGN PATENT DOCUMENTS

JP 2000-085604 A 3/2000
JP 2008-284889 A 11/2008

OTHER PUBLICATIONS

Office Action issued in corresponding Chinese Patent Application No. 201980082182.2 dated Feb. 7, 2023.

*Primary Examiner* — Long T Tran
(74) *Attorney, Agent, or Firm* — Hauptman Ham, LLP

(57) ABSTRACT

The present disclosure relates to a steering control system, a steering control device, and a steering control method. More specifically, a steering control system according to the present disclosure comprises: an actuator driven at a target driving speed and with a target output current on the basis of an input control signal; a rack bar axially moving by the drive of the actuator; a location sensor for detecting the location of a rack included in the rack bar; and a steering control device for calculating a target rack stroke of the rack on the basis of at least one of a driving speed of a vehicle, a steering angle of a steering wheel and a rotation speed of the steering wheel, and generating a control signal such that the rack moves by the target rack stroke to control the drive of the actuator.

20 Claims, 6 Drawing Sheets

(56) References Cited

U.S. PATENT DOCUMENTS

| | | | |
|---|---|---|---|
| 2007/0217725 A1* | 9/2007 | Budaker | F16C 27/066 |
| | | | 384/536 |
| 2012/0061171 A1* | 3/2012 | Ellis | B62D 1/10 |
| | | | 180/443 |
| 2020/0207410 A1* | 7/2020 | Yamamoto | B60L 15/2036 |
| 2020/0391792 A1* | 12/2020 | Loussaut | G01M 17/06 |
| 2020/0398889 A1* | 12/2020 | Higashi | B62D 3/126 |

* cited by examiner

STEERING CONTROL SYSTEM, STEERING CONTROL DEVICE, AND STEERING CONTROL METHOD

CROSS-REFERENCE OF RELATED APPLICATIONS

This application is the U.S. National Phase under 35 U.S.C. § 371 of International Patent Application No. PCT/KR2019/017386, filed on Dec. 10, 2019, which claims the benefit of Korean Patent Application No. 10-2018-0157763, filed on Dec. 10, 2018, the entire disclosures of each are incorporated by reference herein.

TECHNICAL FIELD

The disclosure relates to a steering control system, a steering control device, and a steering control method.

BACKGROUND ART

Steering control systems installed in vehicles today come in a variety of ways. Among them, four-wheel steering systems are being more developed which control the front and rear wheels so as to enhance the mobility of large vehicles by reducing the turning radius via reverse phase control (relative to the steering direction of the front wheels) when turning at low speed and enhance the stability of the vehicle by reducing, e.g., yaw rate and slide-slip, via in-phase control (relative to the steering direction of the front wheels) when turning at high speed.

The four-wheel steering system generally operates based on steering angle information generated by the driver. Accordingly, the four-wheel steering system does not control the rear wheel steering angle upon determining that the steering angle information generated by the driver is abnormal.

Meanwhile, the steering angle information generated by the driver may be determined to be abnormal due to various causes. For example, the steering angle information may be excessively large due to the driver's excessive manipulation of the steering wheel or wrong control on the electronic control unit (ECU) related to the steering of the vehicle.

In this case, if the steering angle information generated by the driver is excessively large, it leads to an excessive response input outside the limit of the rack generated by mechanical coupling, and an end of the housing surrounding the rack, or an end of the rack, may contact the stopper, and the rack may no longer move in the centerward direction ("on-center") to return to its original position but may rather be stuck.

A need exists for developing technology to prevent the end of the housing surrounding the rack or the end of the rack and the stopper from being stuck.

DISCLOSURE

Technical Problem

In light of the background, according to the disclosure, there are provided a steering control system, a steering control device, and a steering control method for preventing an end of a rack and a stopper from being stuck to each other.

Technical Solution

To address the foregoing issues, according to an embodiment of the disclosure, there is provided a steering control system, comprising an actuator driving at a target driving speed and a target output current based on an input control signal, a rack bar moved by the actuator in an axial direction, a position sensor detecting a position of a rack included in the rack bar, and a steering control device calculating a target rack stroke of the rack based on at least one of a driving speed of a vehicle, a steering angle of a steering wheel, and a rotation speed of the steering wheel and generating the control signal to allow the rack to move by the target rack stroke to thereby control the driving of the actuator, wherein the steering control device includes a rack stroke calculation unit calculating a rack stroke including a moving direction and a moving amount based on the detected position of the rack, an area entry determination unit determining whether an end of the rack bar enters a preset anti-jam control area based on the rack stroke and outputting a flag corresponding to a result of the entry, and a driving controller, if the end of the rack bar enters the anti-jam control area, reducing at least one of the target driving speed and the target output current to a preset control value and controlling the driving of the actuator while the rack moves by the target rack stroke.

According to another embodiment of the disclosure, there is provided a steering control device, comprising a rack stroke calculation unit calculating a rack stroke including a moving direction and a moving amount based on a position of a rack detected by a position sensor, an area entry determination unit determining whether an end of a rack bar enters a preset anti-jam control area based on the rack stroke and outputting a flag corresponding to a result of the entry, and a driving controller, if the end of the rack bar enters the anti-jam control area, reducing at least one of a target driving speed and a target output current of an actuator to a preset control value and controlling a driving of the actuator while the rack moves by a target rack stroke calculated based on at least one of a steering angle of a steering wheel and a rotation speed of the steering wheel.

According to still another embodiment of the disclosure, there is provided a steering control method, comprising calculating a rack stroke including a moving direction and a moving amount based on a position of a rack detected by a position sensor, determining whether an end of a rack bar enters a preset anti-jam control area based on the rack stroke and outputting a flag corresponding to a result of the entry, and if the end of the rack bar enters the anti-jam control area, reducing at least one of a target driving speed and a target output current of an actuator to a preset control value and controlling a driving of the actuator while the rack moves by a target rack stroke calculated based on at least one of a steering angle of a steering wheel and a rotation speed of the steering wheel.

Advantageous Effects

As described above, according to the disclosure, there may be provided a steering control system, a steering control device, and a steering control method for preventing an end of a rack and a stopper from being stuck to each other.

MODE FOR INVENTION

Figure 1:
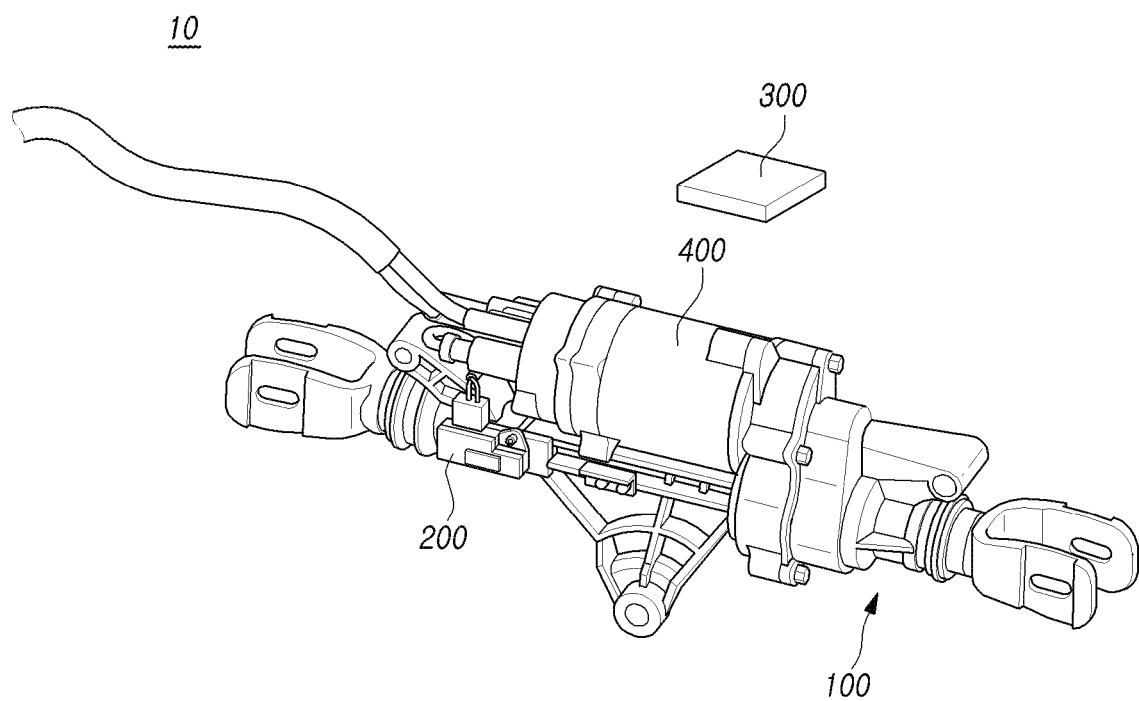
FIG. 1 is a view illustrating a steering control system according to the disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a view illustrating a steering control system 10 according to the disclosure.

Referring to FIG. 1, according to the disclosure, a steering control system 10 includes a rack bar 100, a position sensor 200, a steering control device 300, an actuator 400.

The rack bar 100 may be moved in an axial direction by the driving of the actuator 400. In other words, the rack bar 100 may perform linear motion in the axial direction by driving the actuator 400. To this end, the rack bar 100 may include a rack (or a rack gear. Hereinafter referred to as a "rack").

The rack bar 100 changes the traveling direction of wheels (not shown) through assist arm mounts disposed at two opposite ends in the axial direction. In other words, the vehicle may turn left or right by changing the traveling direction of the wheels included in the vehicle by a linear motion performed in the axial direction of the rack bar 100.

The rack bar 100 may include a housing for protecting and supporting the rack bar 100 around the rack bar 100.

The position sensor 200 may detect the position of the rack included in the rack bar 100. To detect the position of the rack, the position sensor 200 may previously set a reference point.

Specifically, when the rack bar 100 moves to the left or right in the axial direction, the position sensor 200 may detect the position of the rack which moves together with the rack bar 100 by detecting how distant the rack bar 100 moves from the reference point in what direction.

The position sensor 200 may detect the position of the rack, generate a detection signal corresponding thereto, and output it to the steering control device 300.

The position sensor 200 may be disposed in a specific position of the rack bar 100 or the housing of the rack bar 100, and there may be at least one position sensor 200.

The steering control device 300 may calculate a target rack stroke of the rack based on at least one of the driving speed of the vehicle, the steering angle of the steering wheel, and the rotation speed of the steering wheel and generate a control signal so that the rack is moved by the target rack stroke, thereby controlling the driving of the actuator 400.

Here, the rack stroke may mean the amount of movement of the rack according to the linear motion of the rack bar 100. Accordingly, the rack stroke may include a moving direction and a moving amount of the rack. For example, if the rack stroke is 8 mm, it means that the rack bar 100 linearly moves 8 mm in a right axial direction so that the vehicle turns right. However, embodiments of the disclosure are not limited thereto.

Here, the target rack stroke means the amount of movement of the rack to be moved in a specific direction to satisfy a required steering direction and steering angle of the vehicle.

When the vehicle intends to turn at the steering angle required by the driver, the target rack stroke may be determined to differ depending on whether the driver turns the steering wheel quickly or slowly, and various target rack strokes may be determined depending on driving speeds of the vehicle.

Accordingly, the steering control device 300 may calculate the target rack stroke based on the driving speed of the vehicle, the steering angle of the steering wheel, and the rotation speed of the steering wheel.

When the target rack stroke is calculated, the steering control device 300 may generate a control signal to enable the rack bar 100 to move by the target rack stroke and control the driving of the actuator 400.

Here, the control signal may include information regarding, e.g., the target rack stroke, a target driving speed of the actuator 400, and a target output current.

The actuator 400 may drive at the target driving speed and the target output current based on the input control signal. In other words, the actuator 400 may receive a driving current corresponding to the control signal output by the steering control device 300 and drive.

The actuator 400 may be, e.g., a driving motor.

Here, the target driving speed may mean a driving speed required to move the rack by the target rack stroke. For example, if the actuator 400 is a driving motor, the target driving speed means a rotation speed required to move the rack.

Here, the target output current may mean a current required to move the rack by the target rack stroke.

Although not shown, the steering control system 10 may further include a stopper, a steering wheel, a steering column, a reaction force motor, a steering angle sensor, a torque sensor, a lateral acceleration sensor or a yaw rate sensor.

The above-described components may transmit and receive signals to and from each other through controller area network (CAN) communication, which is vehicle-to-vehicle communication.

Figure 2:
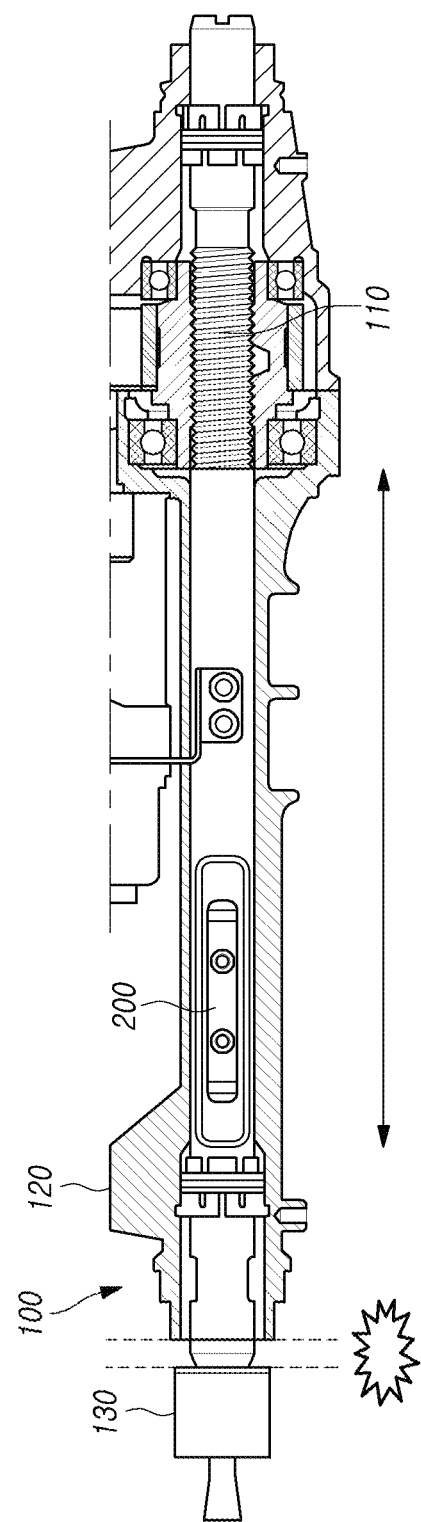
FIG. 2 is a view illustrating operations of a rack bar included in a steering control system according to the disclosure.

FIG. 2 is a view illustrating operations of a rack bar 100 included in a steering control system 10 according to the disclosure.

Referring to FIGS. 1 and 2, according to the disclosure, the rack bar 100 may include a rack 110 engaged with the actuator 400, a housing 120 disposed to surround the rack bar 100, and a stopper 130 coupled to an end of the rack bar 100.

The rack bar 100 may perform a linear motion in the endward or centerward direction of the rack bar 100 by the driving of the actuator 400, and the position sensor 200 disposed in a specific position of the rack bar 100 may indirectly detect the position of the rack 110 which is moved along with the rack bar 100 by detecting how distant the rack bar 100 moves from the reference point in what direction.

Here, since the wheel (not shown) is coupled to each of the left end and the right end of the rack bar 100, the one-to-end direction and the centerward direction of the rack bar 100 are concepts relative to each other and may occur at the same time. In other words, if a first end of the rack bar 100 linearly moves towards the stopper 130, the opposite, second end of the rack bar 100 may simultaneously move linearly in the centerward direction.

Referring to FIG. 2, which illustrates a portion of the rack bar 100, for example, if the direction in which the first end of the rack bar 100, coupled with the stopper 130, moves towards the stopper 130 is the endward direction, the direction in which the second end of the rack bar 100 moves is the centerward direction.

In contrast, if the direction in which the first end of the rack bar 100 coupled with the rack bar 130 moves away from the stopper 130 is the centerward direction, the direction in which the second end of the rack bar 100 moves is the endward direction.

Accordingly, for ease of description, a direction in which the rack bar 100 linearly moves so that an end of the rack bar 100 comes closer to the stopper 130 is defined as the endward direction, and the direction opposite to the endward direction is defined as the centerward direction.

For ease of description, the description focuses on a first one of two opposite ends of the rack bar 100 as illustrated in FIG. 2, but it will be apparent that operations at the opposite end (not shown) of the rack bar 100 are performed opposite to the operations at the first end of the rack bar 100.

Meanwhile, if the target rack stroke is calculated as having a large amount of movement in the endward direction of the rack bar 100 due to, e.g., excessive maneuvering by the driver, the end of the rack bar 100 or the end of the housing 120 and the stopper 130 may be stuck to each other when the rack bar 100 moves in the endward direction of the rack bar 100.

Described below is a steering control device 300 according to the disclosure to address such issue.

Figure 3:
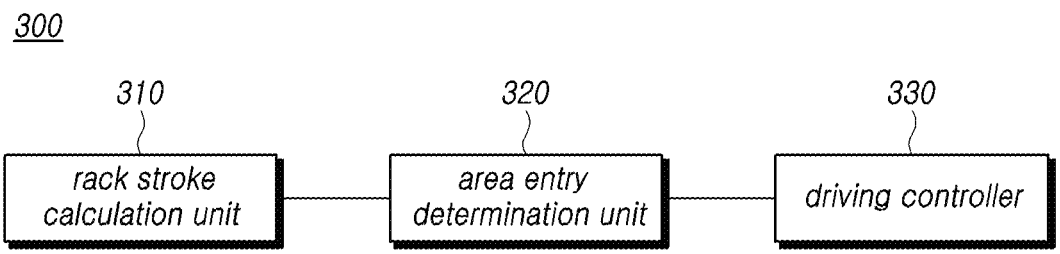
FIG. 3 is a block diagram illustrating a configuration of a steering control device according to the disclosure.

FIG. 3 is a block diagram illustrating a configuration of a steering control device 300 according to the disclosure.

Referring to FIG. 3, according to the disclosure, a steering control device 300 may include a rack stroke calculation unit 310, an area entry determination unit 320, and a driving controller 330.

The rack stroke calculation unit 310 may calculate a rack stroke including a moving direction and a moving amount based on the position of the rack 110 detected by the position sensor 200.

Specifically, the position sensor 200 detects the position of the rack 110 and outputs a detection signal corresponding thereto to the rack stroke calculation unit 310. Then, the rack stroke calculation unit 310 calculates the rack stroke of the rack 110 corresponding to the detection signal.

The area entry determination unit 320 may determine whether an end of the rack bar 100 enters a preset anti-jam control area based on the rack stroke and may output a flag corresponding to the result of the entry.

Here, the anti-jam control area may mean an area set to prevent the end of the rack bar 100 from being stuck to the stopper 130.

The anti-jam control area may include a predetermined range defined from a first position to a second position, and the predetermined range may be designed to differ depending on the performance or type of the vehicle and may be preset by, e.g., an experimental value or a design algorithm.

For example, the anti-jam control area may be defined as +8 mm through +9 mm from the reference point with respect to the right wheel or as −8 mm through −8.85 mm from the reference point with respect to the left wheel. However, embodiments of the disclosure are not limited thereto.

As another example, the length of the anti-jam control area may be dynamically determined based on at least one of the driving speed of the vehicle, the rotation speed of the steering wheel, or driver mode input information. For example, the length of the anti-jam control area may be varied based on changes in the position of the start point, of the start point and the end point constituting the anti-jam control area. Here, the start point may be a first position, the end point may be a second position, and the start point is positioned in the middle of the rack bar, and the end point is positioned at the wheel. Alternatively, the length of the anti-jam control area may be varied based on changes in the positions of both the start point and the end point constituting the anti-jam control area.

Specifically, the length of the anti-jam control area may reduce if the driving speed of the vehicle increases. In other words, if the driving speed of the vehicle increases, the length of the anti-jam control area may reduce reflecting a reduction in the range in which the driver maneuvers the steering wheel. In this case, the length of the anti-jam control area may be set by moving the position of the start point towards the wheel. Alternatively, the length of the anti-jam control area may be set by changing the position of the endpoint toward the center of the rack bar. Alternatively, the length may be reduced by moving both the position of the start point and the position of the end point.

Similarly, the length of the anti-jam control area may be set to increase if the rotation speed of the steering wheel increases. In other words, if the driver quickly turns the steering wheel to increase the rotation speed, the length of the anti-jam control area may be increased to enhance stability. As described above, a length change may be set by changing the position of the start point or the end point.

Alternatively, the length of the anti-jam control area may be determined by driver mode input information. A different length of anti-jam control area may be set for each of a plurality of modes, and a length of anti-jam control area selected by the driver's input signal may be applied. The plurality of modes may be reflected as part of other parameter setting modes, such as a vehicle driving mode or suspension mode. For example, if the driver selects a sports mode, a length of anti-jam control area set as a parameter of the sports mode may be applied.

Here, the flag may mean a predefined bit used by a program for the purpose of memorizing something or leaving an agreed signal to another program.

The flag may include a control start flag predefined to change the control signal in the anti-jam control area and a control release flag predefined to release the control operation in the anti-jam control area.

The operation of the area entry determination unit 320 is described below in detail with reference to FIG. 4.

If the end of the rack bar 100 enters the anti-jam control area, the driving controller 330 may control the driving of the actuator 400 by reducing at least one of the target driving speed and the target output current of the actuator 400 to a preset control value while the rack 110 moves by the target rack stroke calculated based on at least one of the steering angle of the steering wheel and the rotation speed of the steering wheel.

Here, the control value may mean a very small value set to minimize the driving of the actuator 400. Thus, the control value may preferably be set to zero or a value close to zero. The control value may be set to differ depending on the performance of the vehicle or the type of the vehicle and may be preset by an experimental value or a design algorithm.

The driving controller 330 may perform control by the flag output by the above-described area entry determination unit 320.

For example, if the area entry determination unit 320 outputs the control start flag, the driving controller 330 reduces at least one of the target driving speed and target output current of the above-described actuator 400 to the preset control value, controlling the driving of the actuator 400.

As another example, if the area entry determination unit 320 outputs the control release flag, the driving controller 330 stops performing the above-described reduction control, and the driving controller 330 maintains the target driving speed and target output current and controls the driving of the actuator 400.

The operation of the driving controller 330 is described below in detail with reference to FIG. 5.

The above-described steering control device 300 and the components of the steering control device 300 may be implemented as, e.g., an electronic control unit (ECU), a micro control unit (MCU), or a domain control unit (DCU).

Figure 4:
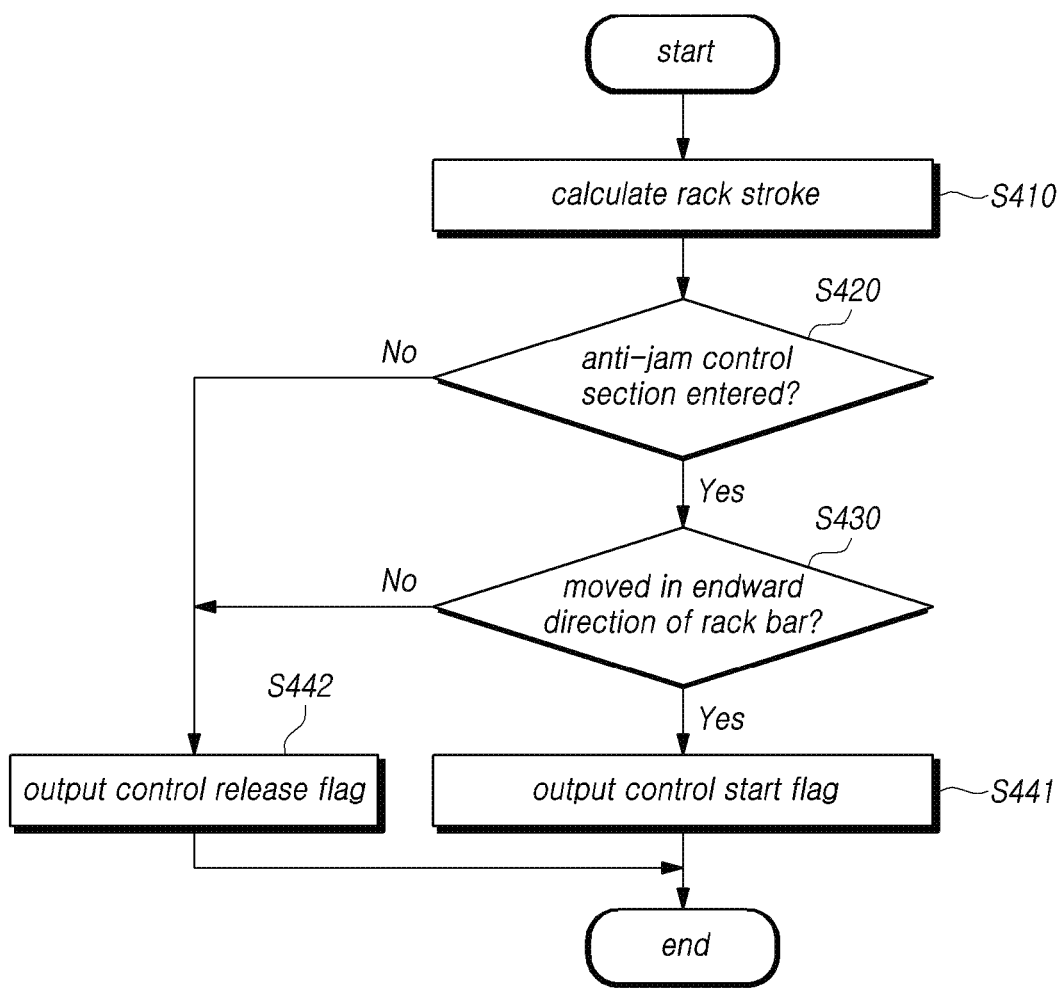
FIG. 4 is a flowchart illustrating an embodiment of an area entry determination unit included in a steering control device according to the disclosure.

FIG. 4 is a flowchart illustrating an embodiment of an area entry determination unit 320 included in a steering control device 300 according to the disclosure.

Referring to FIG. 4, a rack stroke is calculated by the rack stroke calculation unit 310 (S410).

If the rack stroke is calculated, the area entry determination unit 320 identifies the moving direction and moving amount of the rack stroke and determines whether the end of the rack bar 100 enters the anti-jam control area (S420).

If the end of the rack bar 100 enters the anti-jam control area, the area entry determination unit 320 identifies whether the moving direction of the rack stroke is the endward direction of the rack bar 100 (S430).

If the moving direction of the rack stroke is the endward direction of the rack bar 100, the area entry determination unit 320 outputs the control start flag (S441).

In other words, if the moving direction of the rack stroke is the endward direction of the rack bar 100, and the end of the rack bar 100 enters the anti-jam control area, the area entry determination unit 320 outputs the control start flag.

If the end of the rack bar 100 does not enter the anti-jam control area or if the moving direction of the rack stroke is the centerward direction which is opposite to the endward direction of the rack bar 100, the area entry determination unit 320 outputs the control release flag (S442).

This is why if the moving direction of the rack stroke is the centerward direction, it is irrelevant whether the end of the rack bar 100 is stuck, and thus, it is not needed to limit the target driving speed and target output current of the actuator 400.

Meanwhile, when the rack bar 100 does not move so that the rack stroke is not varied or when the position of the rack 110 is a rack stroke corresponding to a neutral state, it is also unnecessary to limit the target driving speed and target output current of the actuator 400 and, even in this case, the area entry determination unit 320 thus outputs the control release flag.

In other words, the area entry determination unit 320 may output the control release flag if the moving direction of the rack stroke is the centerward direction which is opposite to the endward direction of the rack bar, if no variation in rack stroke is detected, if a rack stroke calculated when the position of the rack 110 is neutral is detected, or if the endward direction does not enter the anti-jam control area.

An embodiment in which the driving controller 330 controls the driving of the actuator 400 according to the generated flag is described below using a graph illustrating the relationship between the target driving speed and target output current and the rack stroke.

Figure 5:
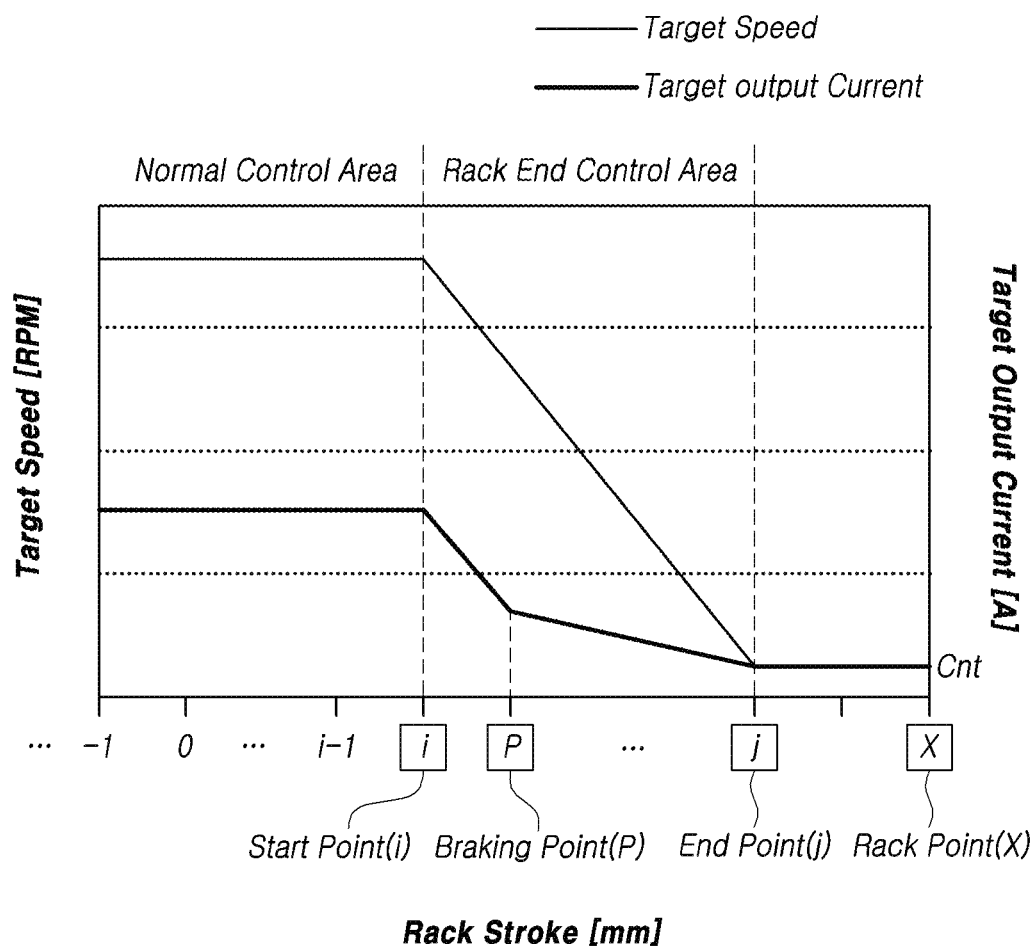
FIG. 5 is a graph illustrating a relationship between a target driving speed and a target output current and a rack stroke according to the disclosure.

FIG. 5 is a graph illustrating a relationship between a target driving speed and a target output current and a rack stroke according to the disclosure.

Referring to FIG. 5, in the graph according to the disclosure, the horizontal axis denotes the rack stroke, and the vertical axes denote the target driving speed (Target Speed) and the target output current (Target Output Current).

The rack stroke indicated on the horizontal axis of the graph is expressed as the amount of movement for one of two opposite ends of the rack bar 100. The value (moving amount) of the rack stroke may be up to the rack end value x corresponding to the end (rack end) of the rack 110.

Here, assuming that the state in which the position of the rack 110 is neutral is 0, the absolute value of the rack stroke increases as the rack bar 100 moves towards the end of the rack bar 100. In contrast, the absolute value of the rack stroke reduces as the rack bar 100 moves in the centerward direction.

The graph includes a normal control area which includes a predetermined area from the zero point, which corresponds to a neutral point, to the start point and an anti-jam control area (rack end control area) including a predetermined area from the start point to the end point.

If the value of the rack stroke falls within a range from the start point i to the end point j, the area entry determination unit 320 determines that the endward direction has entered the anti-jam control area (rack end control area).

If the value of the rack stroke falls between 0 to the start point i, the area entry determination unit 320 may output the control release flag and, upon receiving the control release flag, the driving controller 330 may control the driving of the actuator 400 while maintaining the target driving speed and the target output current.

In this case, if the value of the rack stroke increases and thus falls within the range from the start point i to the end point j, the area entry determination unit 320 may output the control start flag and, in this case, the driving controller 330 may receive the control start flag and perform control to reduce at least one of the target driving speed and target output current of the actuator 400 to a preset control value Cnt.

In other words, the driving controller 330 may perform control to linearly reduce at least one of the target driving speed and target output current to the preset control value Cnt while the end of the rack bar 100 moves within the anti-jam control area (rack end control area).

For example, upon receiving the control start flag, the driving controller 330 performs control to linearly reduce the target driving speed and target output current so that the target driving speed (Target Speed) and target output current (Target Output Current) at the start point i become the control value Cnt and varies the control signal corresponding thereto. Accordingly, the actuator 400 drives at the reduced driving speed and output current.

If the value of the rack stroke exceeds the end point j, the area entry determination unit 320 may output the control release flag and, upon receiving the control release flag, the driving controller 330 may control the driving of the actuator 400 while maintaining the target driving speed and the target output current.

Meanwhile, the anti-jam control area (rack end control area) may be divided into a plurality of reduction areas for each of which a different degree of reduction in at least one of the target driving speed and target output current is set.

For example, a braking point p is set between the start point i and the end point j, and the anti-jam control area (rack end control area) is divided into a first reduction area corresponding to a range between the start point i and the braking point p and a second reduction area corresponding to a range between the braking point p and the end point j. Different degrees of reduction in target output current (Target Output Current) are set for the first reduction area and the second reduction area. However, without limitations thereto, the same description may apply to the target driving speed (Target Speed).

In this case, the driving controller 330 may perform control to reduce at least one of the target driving speed (Target Speed) and the target output current (Target Output Current) depending on the degree of reduction corresponding to each of the plurality of reduction areas while the end of the rack bar 100 moves in the plurality of reduction areas.

For example, the driving controller 330 may perform control to reduce the target output current (Target Output Current) by a first reduction degree while the end of the rack bar 100 moves in the first reduction area and reduce the target output current (Target Output Current) by a second reduction degree, which is less than the first reduction degree, while the end of the rack bar 100 moves in the second reduction area and varies the control signal corresponding thereto. In contrast, the driving controller 330 performs control to reduce the target driving speed (Target Speed) by the same reduction degree while the end of the rack bar 100 moves in the first reduction area and the second reduction area. However, embodiments of the disclosure are not limited thereto.

The driving controller 330 may reduce each of the target driving speed and the target output current to the control value Cnt while the end of the rack bar 100 moves in the anti-jam control area (rack end control area) and, while the end of the rack bar 100 departs from the anti-jam control area (rack end control area) and the rack 110 moves by the target rack stroke, control the driving of the actuator 400 while maintaining each of the target driving speed and target output current as the control value Cnt.

Meanwhile, if the end of the rack bar 100 departs from the anti-jam control area and moves back in the centerward direction, the area entry determination unit 320 may output the control release flag, and the driving controller 330, upon receiving the control release flag, may perform control to maintain the target driving speed and target output current and increase the target driving speed and target output current at the control value Cnt and vary the control signal corresponding thereto. Accordingly, the actuator 400 drives at the increased driving speed and output current.

Meanwhile, what is illustrated in FIG. 5 is merely an example before a better understanding of the disclosure, and the disclosure is not limited thereto.

A steering control method for performing all the embodiments of the disclosure is described below.

Figure 6:
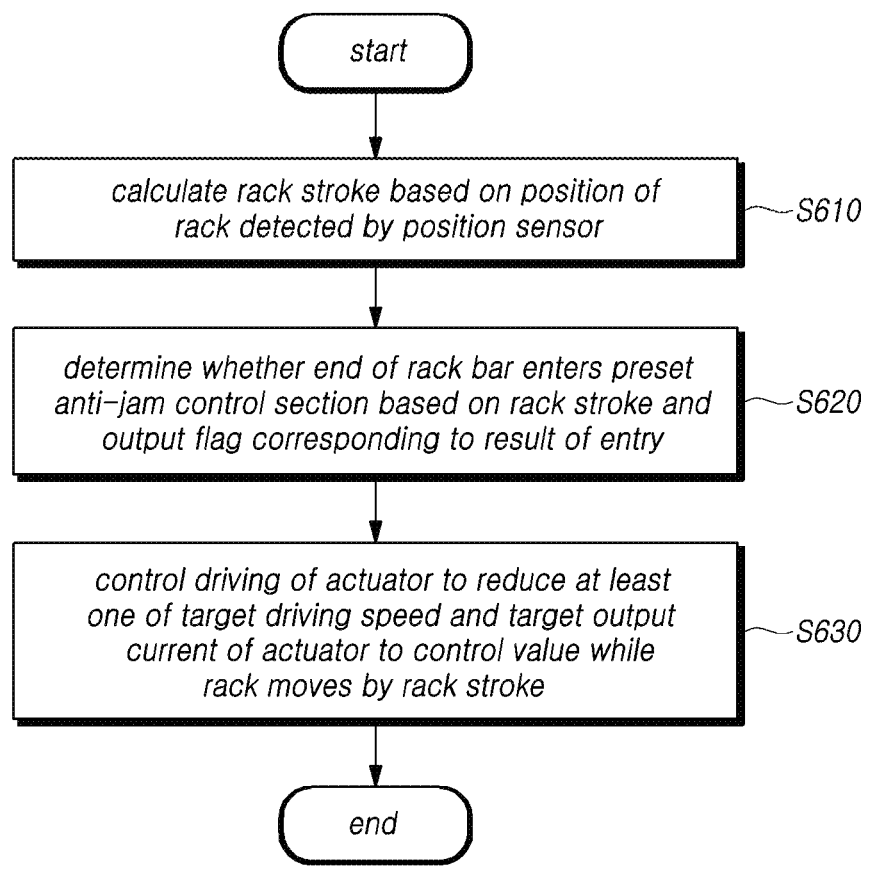
FIG. 6 is a flowchart illustrating a steering control method according to the disclosure.

FIG. 6 is a flowchart illustrating a steering control method according to the disclosure.

Referring to FIG. 6, according to the disclosure, a steering control method may include calculating a rack stroke including a moving direction and a moving amount based on a position of a rack detected by a position sensor (S610), determining whether an end of a rack bar enters a preset anti-jam control area based on the rack stroke and outputting a flag corresponding to a result of the entry (S620), and if the end of the rack bar enters the anti-jam control area, reducing at least one of a target driving speed and a target output current of an actuator to a preset control value and controlling a driving of the actuator while the rack moves by a target rack stroke calculated based on at least one of a steering angle of a steering wheel and a rotation speed of the steering wheel (S630).

As described above, according to the disclosure, there may be provided a steering control system, a steering control device, and a steering control method for preventing an end of a rack and a stopper from being stuck to each other.

According to the disclosure, there may also be provided a steering control system, a steering control device, and a steering control method to prevent (Failsafe) an overcurrent from being generated in an actuator due to an end jamming phenomenon.

According to the disclosure, there may also be provided a steering control system, a steering control device, and a steering control method that may minimize damage to instrument couplings or abrasion to instruments due to an end jamming phenomenon.

According to the disclosure, there may also be provided a steering control system, a steering control device, and a steering control method that may minimize loss of instrumental coupling by preventing an end jamming phenomenon, thereby saving costs.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The invention claimed is:

1. A steering control system, comprising:
an actuator driving at a target driving speed and a target output current based on an input control signal;
a rack bar moved by the actuator in an axial direction;
a position sensor detecting a position of a rack included in the rack bar; and
a steering control device calculating a target rack stroke of the rack based on at least one of a driving speed of a vehicle, a steering angle of a steering wheel, and a rotation speed of the steering wheel and generating the control signal to allow the rack to move by the target rack stroke to thereby control the driving of the actuator, wherein the steering control device includes:
a rack stroke calculation unit calculating a rack stroke including a moving direction and a moving amount based on the detected position of the rack;
an area entry determination unit determining whether an end of the rack bar enters a preset anti-jam control area based on the rack stroke and outputting a flag corresponding to a result of the entry; and
a driving controller, if the end of the rack bar enters the anti-jam control area, reducing at least one of the target driving speed and the target output current to a preset control value and controlling the driving of the actuator while the rack moves by the target rack stroke.

2. The steering control system of claim 1, wherein the area entry determination unit outputs a control start flag if the moving direction of the rack stroke is an endward direction of the rack bar, and the end of the rack bar enters the anti-jam control area.

3. The steering control system of claim 1, wherein the area entry determination unit outputs a control release flag if the moving direction of the rack stroke is a centerward direction, which is opposite to the endward direction of the rack bar, if no variation in the rack stroke is detected, if the rack stroke calculated when the rack is in a neutral position is detected, or if the end of the rack bar does not enter the anti-jam control area.

4. The steering control system of claim 3, wherein if receiving the control release flag, the driving controller does not apply the preset control value to the target driving speed and the target output current but maintains the preset control value in controlling the driving of the actuator.

5. The steering control system of claim 1, wherein the driving controller linearly reduces at least one of the target driving speed and the target output current to the preset control value while the end of the rack bar moves within the anti-jam control area.

6. The steering control system of claim 1, wherein the anti-jam control area is divided into a plurality of reduction areas for each of which a different degree of reduction in at least one of the target driving speed and the target output current is set, and wherein the driving controller reduces at least one of the target driving speed and the target output current according to the degree of reduction corresponding to each of the plurality of reduction areas while the end of the rack bar moves within the plurality of reduction areas.

7. The steering control system of claim 1, wherein the driving controller controls the driving of the actuator by reducing each of the target driving speed and the target output current to the control value while the end of the rack bar moves within the anti-jam control area and maintaining each of the target driving speed and the target output current as the control value while the end of the rack bar departs from the anti-jam control area and the rack moves by the target rack stroke.

8. The steering control system of claim 1, wherein a length of the anti-jam control area is determined based on at least one of the driving speed of the vehicle, the rotation speed of the steering wheel, and driver mode input information.

9. The steering control system of claim 8, wherein the length of the anti-jam control area is varied based on a change in a position of a start point, of the start point and an end point constituting the anti-jam control area.

10. The steering control system of claim 8, wherein the length of the anti-jam control area is decreased if the driving speed of the vehicle increases.

11. The steering control system of claim 8, wherein the length of the anti-jam control area is increased if the rotation speed of the steering wheel increases.

12. A steering control device, comprising:
a rack stroke calculation unit calculating a rack stroke including a moving direction and a moving amount based on a position of a rack detected by a position sensor;
an area entry determination unit determining whether an end of a rack bar enters a preset anti-jam control area based on the rack stroke and outputting a flag corresponding to a result of the entry; and
a driving controller, if the end of the rack bar enters the anti-jam control area, reducing at least one of a target driving speed and a target output current of an actuator to a preset control value and controlling a driving of the actuator while the rack moves by a target rack stroke calculated based on at least one of a steering angle of a steering wheel and a rotation speed of the steering wheel.

13. The steering control device of claim 12, wherein the area entry determination unit outputs a control start flag if the moving direction of the rack stroke is an endward direction of the rack bar, and the end of the rack bar enters the anti-jam control area.

14. The steering control device of claim 12, wherein the area entry determination unit outputs a control release flag if the moving direction of the rack stroke is a centerward direction, which is opposite to the endward direction of the rack bar, if no variation in the rack stroke is detected, if the rack stroke calculated when the rack is in a neutral position is detected, or if the end of the rack bar does not enter the anti-jam control area.

15. The steering control device of claim 14, wherein if receiving the control release flag, the driving controller does not apply the preset control value to the target driving speed and the target output current but maintains the preset control value in controlling the driving of the actuator.

16. The steering control device of claim 12, wherein the driving controller linearly reduces at least one of the target driving speed and the target output current to the preset control value while the end of the rack bar moves within the anti-jam control area.

17. The steering control device of claim 12, wherein the anti-jam control area is divided into a plurality of reduction areas for each of which a different degree of reduction in at least one of the target driving speed and the target output current is set, and wherein the driving controller reduces at least one of the target driving speed and the target output current according to the degree of reduction corresponding to each of the plurality of reduction areas while the end of the rack bar moves within the plurality of reduction areas.

18. The steering control device of claim 12, wherein the driving controller controls the driving of the actuator by reducing each of the target driving speed and the target output current to the control value while the end of the rack bar moves within the anti-jam control area and maintaining each of the target driving speed and the target output current as the control value while the end of the rack bar departs from the anti-jam control area and the rack moves by the target rack stroke.

19. The steering control device of claim 12, wherein a length of the anti-jam control area is determined based on at least one of the driving speed of the vehicle, the rotation speed of the steering wheel, and driver mode input information.

20. A steering control method, comprising:
calculating a rack stroke including a moving direction and a moving amount based on a position of a rack detected by a position sensor;
determining whether an end of a rack bar enters a preset anti-jam control area based on the rack stroke and outputting a flag corresponding to a result of the entry; and
if the end of the rack bar enters the anti-jam control area, reducing at least one of a target driving speed and a target output current of an actuator to a preset control value and controlling a driving of the actuator while the rack moves by a target rack stroke calculated based on at least one of a steering angle of a steering wheel and a rotation speed of the steering wheel.

* * * * *